United States Patent
Oshima (10) Patent No.: US 7,250,972 B2
(45) Date of Patent: Jul. 31, 2007

(54) IMAGE-PICKUP APPARATUS WITH REMOVABLE LENS APPARATUS

(75) Inventor: Shintaro Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 757 days.

(21) Appl. No.: 10/653,800

(22) Filed: Sep. 3, 2003

(65) Prior Publication Data

US 2004/0041937 A1    Mar. 4, 2004

(30) Foreign Application Priority Data

Sep. 4, 2002   (JP) ............................. 2002-259121

(51) Int. Cl.
   *G02B 13/16*    (2006.01)
   *H04N 5/225*    (2006.01)
   *G03B 17/02*    (2006.01)

(52) U.S. Cl. ...................... 348/335; 348/373; 396/535

(58) Field of Classification Search ..................... None
   See application file for complete search history.

(56) References Cited

U.S. PATENT DOCUMENTS

| | | | |
|---|---|---|---|
| 5,218,442 A | * | 6/1993 | Hamada et al. .......... 348/208.1 |
| 5,233,426 A | * | 8/1993 | Suzuki et al. .......... 348/207.99 |
| 5,739,853 A | * | 4/1998 | Takahashi .................... 348/335 |
| 6,035,147 A | * | 3/2000 | Kurosawa .................... 396/429 |
| 6,742,941 B2 | * | 6/2004 | Fukuda ........................ 396/358 |
| 6,992,722 B2 | * | 1/2006 | Jung ........................... 348/373 |
| 7,057,642 B2 | * | 6/2006 | Mogamiya et al. ......... 348/374 |
| 2002/0031347 A1 | | 3/2002 | Fukuda |

FOREIGN PATENT DOCUMENTS

| | | |
|---|---|---|
| JP | 2002-006380 | 1/2002 |
| JP | 2002/6380 | 9/2002 |

* cited by examiner

*Primary Examiner*—David Ometz
*Assistant Examiner*—Luong T. Nguyen
(74) *Attorney, Agent, or Firm*—Cowan, Liebowitz & Latman, P.C.

(57) ABSTRACT

An image-pickup apparatus that has a simple structure is disclosed. The image-pickup apparatus includes a linking box provided with a lens mount portion, an image-pickup device unit that receives light that has passed through the lens mount portion, the linking box and a main chassis that is arranged between the linking box and the image-pickup device unit. The main chassis includes an aperture portion through which the light passes. The linking box is fixed to the main chassis, and the image-pickup device unit is fixed to the linking box.

3 Claims, 5 Drawing Sheets

IMAGE-PICKUP APPARATUS WITH REMOVABLE LENS APPARATUS

BACKGROUND OF THE INVENTION

The present invention relates to image-pickup apparatuses such as single-lens reflex digital cameras with exchangeable lens apparatus, as well as to image-pickup systems including an image-pickup apparatus and a lens apparatus that can be mounted removably to that image-pickup apparatus.

DESCRIPTION OF THE RELATED ART

Conventionally, the body of single-lens reflex cameras is, for example, made by coupling together a main body member, a linking member and a mirror box. The main body member includes a cartridge chamber accommodating a film cartridge, a spool chamber accommodating a spool for rolling up film, and a linking portion linking the cartridge chamber and the spool chamber and constituting a film rail surface. The linking member is for compensating the insufficient strength on the lens mount side of the main body member. A mounting member to which a lens apparatus can be mounted removably is provided on the front side of the mirror box. To the mirror box are attached the mounting member and a mirror mechanism that can be advanced and retreated with respect to the image-taking light path and that reflects a light flux coming from the lens apparatus and guides it toward a viewfinder optical system when it is placed in the image-taking light path.

Thus, when the camera body has a structure that is partitioned into the main body member having a rail surface, which determines the position of the film surface, and a mirror box that holds the mounting member, then it is difficult to accurately set the flange focal distance, which is the distance from the lens mounting surface to the film surface, when coupling together the main body member and the mirror box. Moreover, even when the flange focal distance has been adjusted, that flange focal distance may be easily changed when a load is exerted on the front end of the lens apparatus, shifting the positional relation between the mirror box and the main body member.

A digital single-lens reflex camera using an image-pickup device instead of film is disclosed in Japanese Patent Laid-Open No. 2002-6380 (corresponding to US Patent Application Publication 2002/0031347), for example. In the camera disclosed therein, a lens holding unit which holds a removable lens apparatus and an image-pickup unit picking up an image that is formed on it by the lens apparatus are attached to a camera body. The camera body is constituted of a front body member, a rear body member and a main body member. The front body member forms the front portion of the camera body. The rear body member forms the rear portion of the camera body and is coupled to the front body member. The lens holding unit and the image-pickup unit are attached to the main body member, which is coupled to at least one of the front body member and the rear body member.

With this configuration, when an external force is exerted on the lens apparatus mounted to the lens holding unit, exerting a force that might deform the camera body, then the influence that the external force exerted on the lens apparatus has on the camera body can be reduced, since the lens holding unit and the image-pickup unit, which determine the flange focal distance, which is the distance from the lens mounting surface to the film surface, are both attached to the main body member, and the main body member is fixed only to the front body member, which is the member of the main body member and the rear body member that is closer to the lens apparatus.

On the other hand, in digital cameras in general, that is, not limited to single-lens reflex digital cameras, due to the processing of the image obtained with the image-pickup device and high-speed processing of the recording controls, a power source is necessary that can drive a CPU with a high-speed clock as well as many electronic devices, so that the electromagnetic noise that is generated also increases. However, conventional camera bodies are often made of plastic, so that it is difficult to suppress noise efficiently.

With regard to these problems, by arranging mounted electrical components between the front body member and the rear body member and connecting the front body member and the rear body member electrically to ground, as proposed by the assignee in the above-mentioned publication, the noise leaking from these mounted electrical components to the outside of the camera can be reduced.

However, in this example, the front body member and the rear body member are made of metal plates with complicated shapes, so that the overall image-pickup apparatus tends to become large and heavy. Moreover, machining of the front body member and the rear body member is difficult, which leads to higher costs.

Moreover, the main body member (referred to as linking box below) including the image-pickup unit, is covered by the front body member and the rear body member, so that the maintainability of members around the image-pickup device may be poor.

As for measures against electromagnetic noise, leakage of noise to the outside cannot be sufficiently blocked with the front body member and the rear body member alone. Furthermore, not only with regard to measures against noise, but also in view of measures against static electricity, an outside casing member provided with electric conductivity sometimes became necessary outside the front body member and the rear body member.

SUMMARY OF THE INVENTION

It is an object of the present invention to provide an image-pickup apparatus to which a lens apparatus can be mounted removably and an image-pickup system with a removable lens apparatus, which has a simple structure, which can maintain the flange focal distance with high precision, and which has high maintainability with regard to the members around the image-pickup device.

In order to attain this object, an image-pickup apparatus according to one aspect of the present invention includes a linking box provided with a lens mount portion, an image-pickup device unit that receives an image-taking light flux that has passed through the lens mount portion and the linking box, and a main chassis that is arranged between the linking box and the image-pickup device unit, and that includes an aperture portion through which the image-taking light flux passes. The linking box is fixed to the main chassis, and the image-pickup device unit is fixed to the linking box.

Moreover, the linking box may be fastened to the main chassis at a plurality of fastening positions, and the image-pickup device unit may fastened to the linking box at a plurality of fastening positions, and each of the fastening positions at which the linking box is fastened to the main chassis may be located at a position near or adjacent to one of a plurality of fastening positions at which the image-pickup device unit is fastened to the linking box.

Moreover, at least a portion of the linking box that is near a location where the lens mount portion is provided may be linked to a linking portion provided integrally with the main chassis.

Furthermore, at least a portion of the linking box that is near a location where the lens mount portion is provided and the main chassis are linked by a linking member.

An image-pickup system according to one aspect of the present invention includes an image-pickup apparatus as described above, and a lens apparatus that can be mounted removably to the lens mount portion of the image-taking apparatus. The image-pickup device unit receives an image-taking light flux that has passed through the lens apparatus.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Hereinafter, preferred embodiments of the invention will be described in detail with reference to the drawings.

Figure 1:
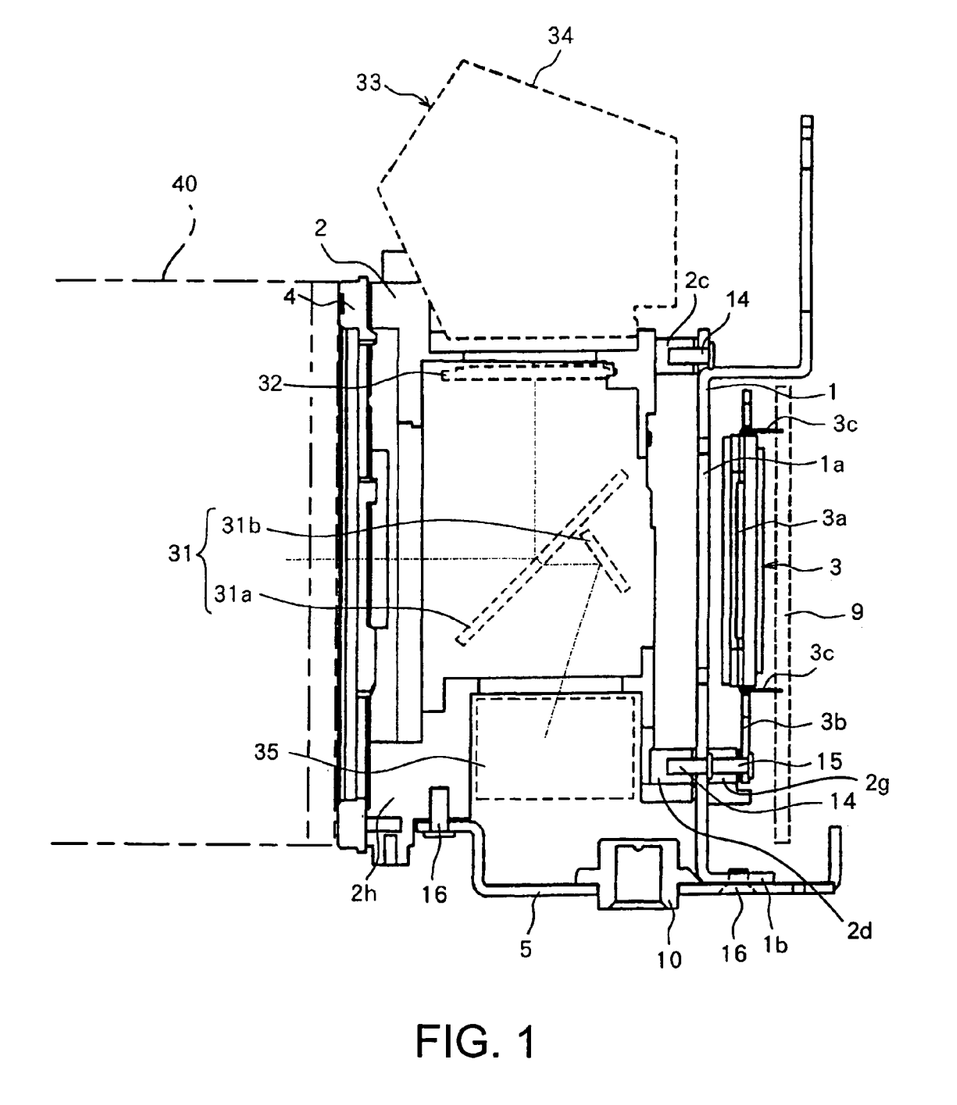
FIG. 1 illustrates the main structural components in a central longitudinal sectional view of an image-pickup apparatus according to an embodiment of the present invention.
Figure 2:
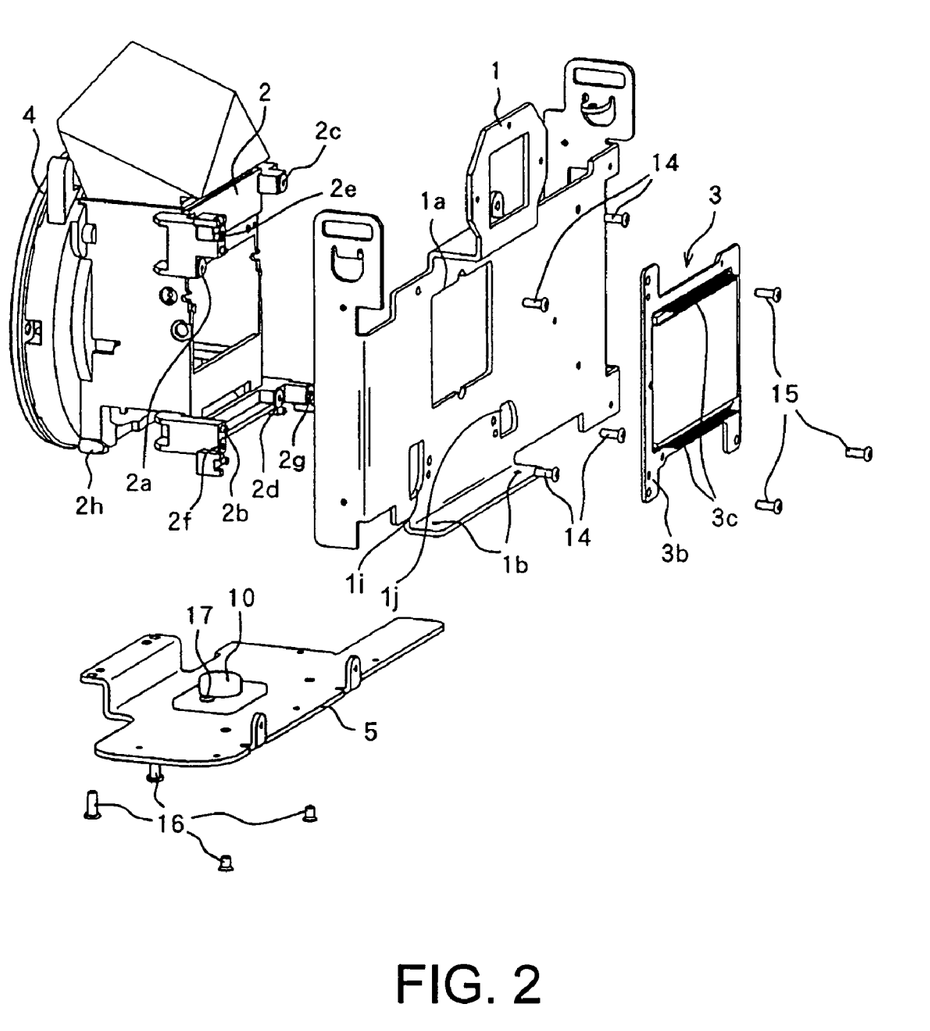
FIG. 2 is an exploded perspective view of the main structural components in the image-pickup apparatus of an embodiment of the present invention.

FIGS. 1 to 5 show the structure of a single-lens reflex digital camera according to an embodiment of the present invention. FIG. 1 illustrates the main structural components in a longitudinal cross-sectional view of the image-pickup apparatus of this embodiment, whereas FIG. 2 is an exploded perspective view of the main structural components in the image-pickup apparatus of this embodiment. In these figures, numerical reference 1 denotes a main chassis made by press-forming a metal plate, whose size in longitudinal direction (direction vertical to the paper plane of FIG. 1) is substantially the same as its size in the longitudinal direction of the image-pickup apparatus main body. The main chassis 1 is provided with an aperture portion 1a for guiding light flux from the object that has entered through the lens apparatus to a sensor-type light-receiving surface of an image-pickup device unit 3, which is described further below.

As the material of the metal plate used for the main chassis 1, it is possible to utilize aluminum, iron, stainless steel, magnesium, titanium or the like (preferably, the material is electrically conductive) with a thickness of about 0.8 mm to 2 mm. The thickness of the metal plate used for the main chassis 1 may be chosen as appropriate, giving consideration to material properties and strength.

Thus, if the main chassis is made of a metal component and is electrically connected to ground, and mounted electrical components are arranged around this main chassis, then it is possible to reduce malfunctioning due to due to noise between the mounted electrical components as well as malfunctioning of the mounted electrical components due to static electricity.

Numerical reference 2 denotes a linking box that is arranged at the front-side (object side) of the main chassis 1. A lens mount portion (lens-holding unit) 4, a mirror unit 31 (explained below), a viewfinder optical system 33 (including a focusing screen 32), an image-pickup device unit 3, and a focus detection unit 35 and others are fitted to this linking box 2. As shown in FIG. 2, the main chassis 1 is fixed by screws 14 that are screwed from the rear side into screw fittings 2a, 2b, 2c and 2d of the linking box 2. That is to say, this linking box functions as a so-called mirror box. Thus, by arranging the components whose positional relations (in particular the optical distances) need to be maintained accurately in or on the linking box, changes in the flange focal distance can be suppressed.

Numerical reference 3 denotes an image-pickup device unit. Numerical reference 3a denotes an image-pickup device, such as a CCD or C-MOS, which photo-electrically converts light from the object that has been received through the lens apparatus mounted to the lens mount portion 4. Numerical reference 3b denotes an image-pickup device holding member for fixing the image-pickup device 3a to the rear end of the linking box 2. The image-pickup device 3a and the image-pickup device holding member 3b are configured as a single integrated unit that is held together by gluing or the like. Moreover, the main chassis 1 is provided with aperture portion li and lj through which the screw fittings 2f and 2g are passed, and the image-pickup device unit 3 is fixed with screws 15 that are screwed to the screw fittings 2e, 2f and 2g of the linking box 2 from the rear side of the main chassis 1, as shown in FIG. 2.

That is to say, this structure includes the linking box 2 provided with the lens mount portion 4, the image-pickup device unit 3 that receives the image-taking light flux that has passed through the lens mount portion 4 and the linking box 2, and the main chassis 1 arranged between the linking box 2 and the image-pickup device unit 3 and having an aperture portion 1a through which the image-taking light flux passes. The linking box 2 is fixed to the main chassis 1, and the image-pickup device unit 3 is fixed to the linking box 2.

The surroundings of the screw fittings 2a, 2b, 2c and 2d of the linking box 2 are fixed with screws 14 to the main chassis 1, in order to enhance its strength and inhibit deformations. That is to say, the attachment face of the linking box 2 at which the image-pickup device unit is attached is mechanically stabilized by reducing the distance between the screw fittings 2e, 2f and 2g at which the image-pickup device unit 3 is fastened to the linking box 2 and the screw fittings 2a, 2b, 2c and 2d at which the main chassis 1 is fastened to the linking box 2, or by arranging those two groups of screw fittings adjacent to one another.

In other words, the linking box 2 is fastened to the main chassis 1 at a plurality of locations and the image-pickup device unit 3 is fastened to the linking box 2 also at a plurality of locations, and each of the fastening positions at which the linking box 2 is fastened to the main chassis 1 is near one of a plurality of the fastening positions at which the image-pickup device unit 3 is fastened to the linking box 2 or arranged at a position adjacent thereto.

With this structure, the resistance against deformations near the fastening positions of the main chassis can be increased, so that deformations of the surface at which 1 the image-pickup device unit 3 is attached to the linking box 2 can be effectively suppressed when an external force is exerted on the lens apparatus.

Numerical reference 9 denotes an electric circuit board to which lead portions 3c for transmitting the electric output from the image-pickup device 3a are connected by soldering. Output signals from the image-pickup device 3a are transmitted to a processing circuit on this electric circuit board or to another electric circuit board not shown in the drawings.

The lens mount portion 4 is fixedly attached to the front end of the linking box 2 (that is, the end on the object side), and a lens apparatus 40 (shown by dashed line in FIG. 1) is mounted removably to the front face (mounting face) of the lens mount portion 4 by a bayonet mechanism or the like. Thus, a single-lens reflex image-pickup system is configured by mounting the lens apparatus to the lens mount portion 4. It should be noted that this lens mount portion 4 is fixedly attached to the linking box 2, but there is no limitation to this, and the same effects can, of course, also be attained if the lens mount portion 4 is formed in one piece with the linking box 2.

Numerical reference 5 denotes a linking member that constitutes a bottom portion of the image-pickup apparatus main body. This linking member 5 is fastened with screws 16 that are screwed from the bottom side of the image-pickup apparatus main body into screw fittings 1b at a bent portion on the bottom side of the main chassis 1 formed directly below the image-pickup device unit 3, and screw fittings 2h provided at both sides of the bottom portion of the linking box 2 as well as near the locations where the lens mount portion 4 are fixedly attached to the linking box 2 (See FIG. 1).

That is to say, the main chassis 1 and at least a portion of the linking box 2 that is near the location where the lens mount portion 4 is provided are linked by this linking member 5. Thus, by reinforcing with the linking member 5 at least a portion of the linking box 2 that is near the location where the lens mount portion 4 is provided, a structure is achieved that is not easily affected by forces on the lens apparatus 40 that may lead to deformation (and change the flange focal distance).

As can be seen in FIG. 2, a tripod socket 10 is fixedly attached with a screw 17 near the center of the linking member 5. It should be noted that making this linking member 5 from plastic or the like reduces costs, whereas making it from metal or the like increases its strength and electromagnetic noise resistance.

If the linking member 5 is made for example by press-forming using a metal plate, then aluminum, iron, stainless steel, magnesium or titanium or the like are conceivable as materials used for the metal plate. A thickness of about 0.8 mm to 2 mm is used for the metal plate, and this thickness should be chosen as appropriate, giving consideration to material properties and strength. By press-forming the component, it is possible to provide a relatively inexpensive chassis component with high strength.

The linking member 5 may also be made by die-casting or thixomolding using a metal material such as aluminum or magnesium. Also when using a plastic material for the linking member 5, it is possible to connect the linking member 5 electrically to ground potential by providing it with electrical conductivity by applying metal plating or a conductive coating, or by using a conductive resin material. Thus, malfunctioning of the mounted electrical components due to noise or static electricity can be reduced.

Moreover, this embodiment was explained for the case that the linking member 5 is a member that is separate from the main chassis 1, but there is no limitation to this, and similar effects can also be attained with configurations in which in which the main chassis 1 and the linking member 5 are formed integrally as one component, that is, configurations in which at least a portion of the linking box that is near the location where the lens mount portion is provided is linked to a linking portion provided integrally with the main chassis.

Moreover, ordinary single-lens reflex digital cameras are equipped with a focal plane shutter in order to restrict the amount of light that is irradiated from the lens apparatus 40 mounted to the lens mount portion 4 onto the image-pickup device 3a, however this is not strictly speaking necessary given the structure of the image-pickup apparatus according to this embodiment, so that no focal plane shutter is shown in the drawings illustrating this embodiment. Moreover, instead of a mechanical shutter device, which is typical for focal plane shutters, it is possible to control the exposure time electrically with the image-pickup device and control circuitry.

The mirror unit 31 is constituted of a main mirror 31a, a sub-mirror 31b, and a driving mechanism (not shown in the drawings) driving the main mirror 31a and the sub-mirror 31b. The main mirror 31a can be advanced and retreated (i.e. moved up and down) in the image-taking light path with respect to a position in front of a shutter unit (not shown in the drawings). The sub-mirror 31b is disposed behind the main mirror 31a (at a position on the image-taking optical axis that is closer to the image-pickup device unit 3 than the main mirror 31a), and can be folded or unfolded with respect to the main mirror 31a.

When the main mirror 31a is positioned in the image-taking light path (mirror down position), the object light flux coming from the lens apparatus 40 mounted to the lens mount portion 4 is reflected toward the viewfinder optical system 33. A half mirror that lets a portion of the light flux coming from the lens apparatus 40 pass through is used for the main mirror 31a, and the light flux that has passed through the main mirror 31a is reflected toward the focus detection unit 35 by the sub-mirror 31b that is unfolded with respect to the main mirror 31a.

It should be noted that when the main mirror 31a is retracted out of the image-taking light path (mirror up position), then the object light flux coming from the lens apparatus 40 travels unhindered toward the image-pickup device 3a. In this situation, the sub-mirror 31b is folded up against the main mirror 31a.

Numerical reference 32 denotes a focusing screen, which is one of the structural elements of the viewfinder optical system 33. The object light flux reflected by the mirror unit 31 is focused on this focusing screen 32. Thus, the camera operator can observe the object through the viewfinder.

Numerical reference 34 denotes a pentaprism, which is also a structural element of the viewfinder optical system 33. The pentaprism 34 guides the object image formed on the focusing screen 32 to a viewfinder eyepiece not shown in the drawings.

It should be noted that the above-described components of mirror unit 31, viewfinder optical system 33 (including focusing screen 32), and focus detection unit 35 are strictly speaking not necessary if using for example a focus detection using an electronic viewfinder (EVF) or an image-pickup signal, as well-known in the art.

Figure 3:
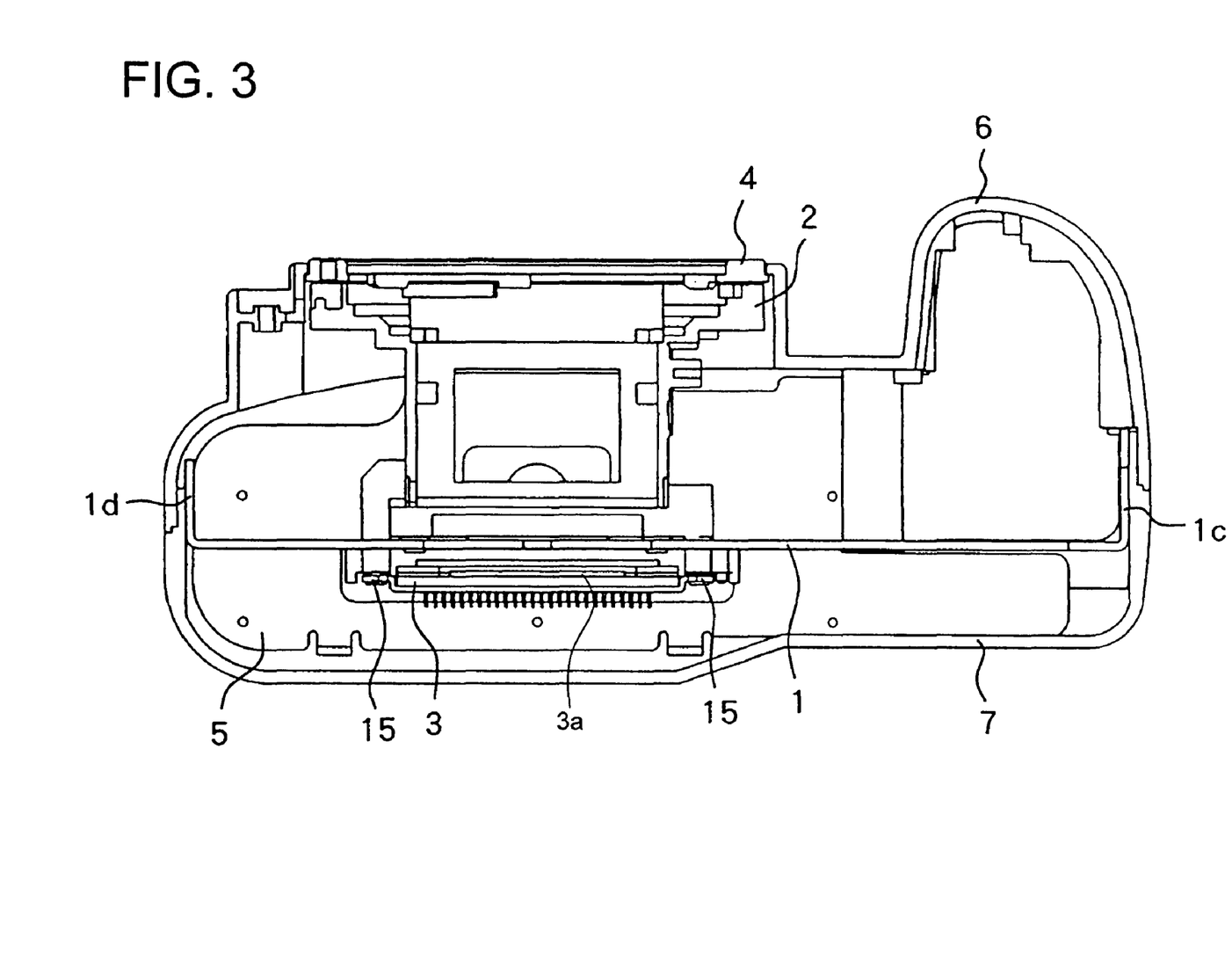
FIG. 3 illustrates the main structural components in a central transverse sectional view of the image-pickup apparatus of the embodiment.
Figure 4:
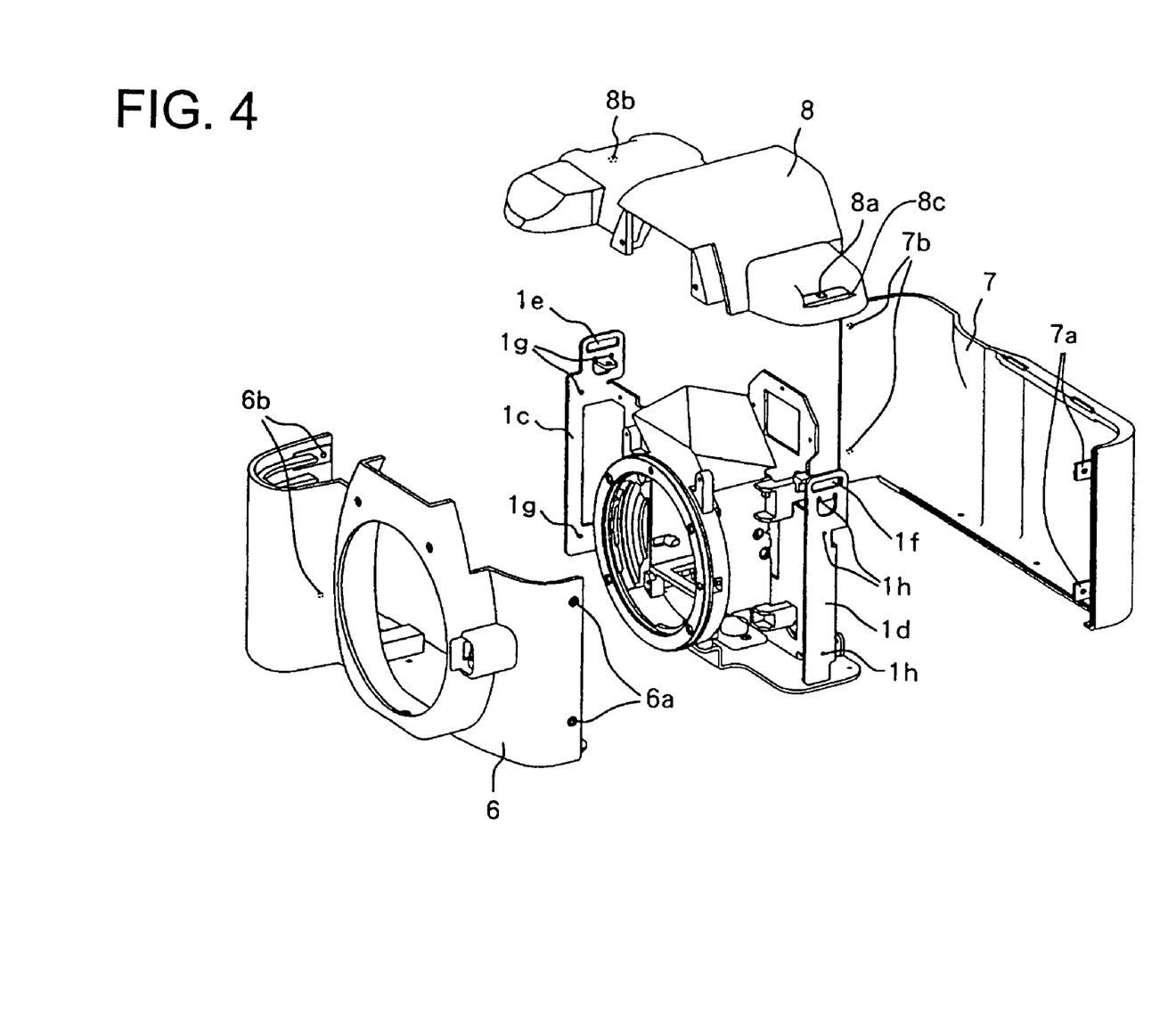
FIG. 4 is an exploded perspective view of the exterior components of the main structural components in the image-pickup apparatus of the embodiment.
Figure 5:
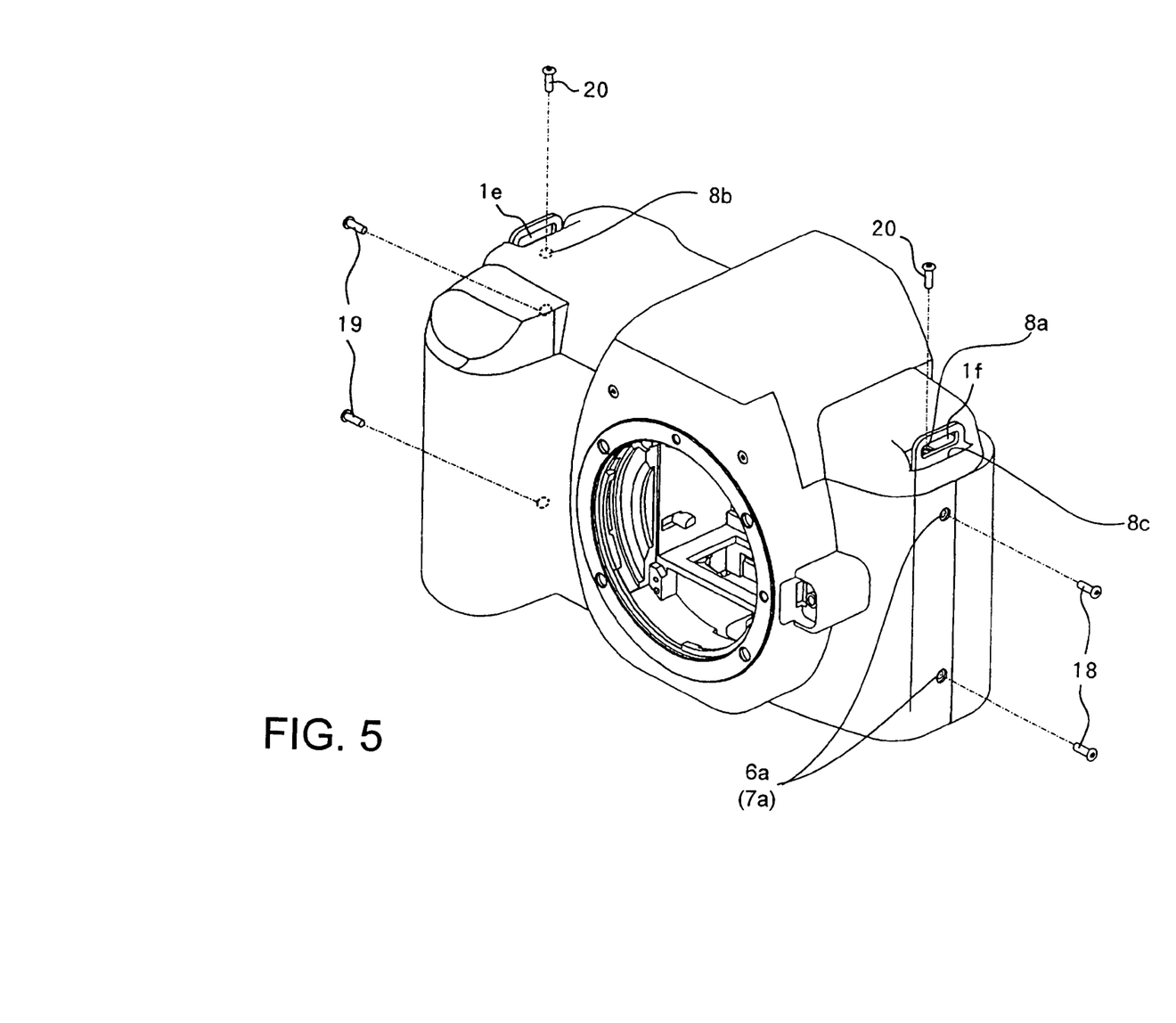
FIG. 5 is a diagram illustrating a method for fixing the exterior components in the image-pickup apparatus of the embodiment.

FIG. 3 illustrates the main structural components in a central transverse sectional view of the image-pickup apparatus of this embodiment. FIG. 4 is an exploded perspective view of the exterior components of the main structural components in the image-pickup apparatus of this embodiment. FIG. 5 illustrates a method for fixing the exterior components in the image-pickup apparatus according to this embodiment.

As shown in the figures, the main chassis 1 is bent to a substantially right angle near both ends in the longitudinal direction, and is all in all shaped like a square bracket. Here, the portions which are bent at both ends of the main chassis 1 are referred to as bent portions 1c and 1d. The bent portions 1c and 1d are respectively provided with screw fitting portions 1g and 1h.

Aperture portions 1e and 1f through which a carrying strap for carrying the image-pickup apparatus are provided at the top of the bent portions 1c and 1d.

Numerical reference 6 denotes a front cover forming the outer casing to the front of the image-pickup apparatus, numerical reference 7 denotes a back cover forming the outer casing to the rear of the image-pickup apparatus, and numerical reference 8 denotes a top cover forming the outer casing on the top of the image-pickup apparatus.

These outer casing components may be made of a metal material with intrinsic conductivity, such as aluminum, stainless steel, iron, magnesium or titanium. Of course, there is no limitation to this, and it is also possible to use a material that has been provided with conductivity by mixing a conductive filler such as carbon fibers or powder into a resin material, such as polycarbonate, or ABS or the like. Other possibilities include using an ordinary resin material that is not intrinsically conductive, such as polycarbonate or ABS, and forming a conductive metal thin film on its surface by plating, painting or vapor deposition.

That is to say, both ends in longitudinal direction of the main chassis 1 are bent at substantially right angles, and these two bent ends (bent portions 1c and 1d) are provided with fitting portions for mechanically and electrically linking a plurality of outer casing components (6, 7 and 8) that are either made of a conductive material or which have a conductive coating formed on them.

Thus, the outer casing components can be electrically connected to ground via the main chassis 1, so that the radiation of noise outside the image-pickup apparatus and the influence of static electricity can be effectively reduced.

Screw hole portions 6a and 6b are formed in both ends in longitudinal direction (in horizontal direction in FIG. 3) of the front cover 6, and screw hole portions 7a and 7b are formed in both ends in longitudinal direction of the back cover 7. As shown in FIG. 5, screws 18 are passed through the screw hole portions 6a of the front cover 6 and the screw hole portions 7a of the back cover 7, and fastened to the screw fitting portions 1h provided in the bent portion 1d of the main chassis 1. Similarly, screws 19 are passed through the screw hole portions 6b of the front cover 6 and the screw hole portions 7b of the back cover 7, and fastened to the screw fitting portions 1g provide in the bent portion 1c of the main chassis 1.

Screw hole portions 8a and 8b are provided at both ends in the longitudinal direction of the top cover 8, and screws 20 are passed through the screw holes 8a and 8b of the top cover 8 and fastened to the screw fitting portions 1g and 1f provided at the upper part of the bent portions 1c and 1d of the main chassis 1. With this structure, the outer casing covers 6, 7 and 8 are mechanically and electrically coupled directly with the main chassis 1 or indirectly through the screws 18, 19 and 20.

Thus, the outer casing covers 6, 7 and 8 are fastened with screws 18, 19 and 20 to screw fitting portions 1g and 1h provided in the main chassis 1 (that is, further to the linking box 2, the linking member 5, and other structural components not shown in the drawings). The aperture portions 1e and 1f in the main chassis 1 are passed through aperture portions 8c formed at both ends in the longitudinal direction of the top cover 8 and exposed to the outside of the outer casing covers 6, 7 and 8, such that a strap or the like for carrying the image-pickup apparatus can be attached to the aperture portions 1e and 1f of the exposed main chassis 1 (see FIG. 5).

In this embodiment, two aperture portions 1e and 1f are provided at the top of the bent portions 1c and 1d, but aperture portions may also be provided at both vertical ends of the bent portions 1c and 1d, so that a strap or the like for carrying the image-pickup apparatus can be attached in a similar manner as with the aperture portions 1e and 1f.

Thus, at least two aperture portions for attaching a carrying strap are formed at the bent portions (the two folded ends), so that it is not necessary to add a separate metal fitting for attaching a carrying strap, and the mechanical strength can be increased. Moreover, the bent portions also function as electrical ground, so that the influence of static electricity on other mounted electrical components can be reduced.

Thus, by fixing both the lens mount portion 4 and the image-pickup device unit 3, which determine the flange focal distance, to the linking box 2, an image-pickup apparatus can be provided in which changes in the flange focal distance tend not to occur even when an external force is applied the lens apparatus 40 mounted to the lens mount portion 4, exerting a force that might deform the image-pickup apparatus main body (that is, even in a situation in which an external force is applied to the lens apparatus, stable optical characteristics are ensured and the reliability of the apparatus is high).

Here, the linking box 2 and the image-pickup device unit 3 are not assembled by fixing them to the main chassis 1 disposed between them, instead the linking box 2 and the image-pickup device unit 3 are assembled by fixing them directly to one another, thereby reducing the number of components that are disposed between the lens mount portion 4 and the image-pickup device unit 3 to a minimum. Thus, further diminishing their susceptibility to manufacturing errors 3 or the like at the time of assembly.

Moreover, the image-pickup device unit 3 is disposed behind the main chassis 1 (i.e. on the side opposite to the object side), so that maintenance of the members around the image-pickup device can be facilitated. Moreover, due to this simple structure, it is possible to provide an image-pickup apparatus having a compact and light body with simple shape.

As explained above, an image-pickup apparatus and an image-pickup system can be provided, wherein the flange focal distance can be maintained with high precision with a simple structure, and wherein maintenance of the members around the image-pickup device is easy.

What is claimed is:

1. An image-pickup apparatus to which a lens apparatus can be mounted removably, comprising:
   a linking box provided with a lens mount portion to which the lens apparatus can be mounted;
   an image-pickup device unit that receives light that has passed through the lens mount portion and the linking box; and a main chassis that is arranged between the linking box and the image-pickup device unit, and that includes an aperture portion through which the light passes;

wherein the linking box is fixed to the main chassis, and the image-pickup device unit is fixed to the linking box from a side opposite to the linking box side with respect to the main chassis, and wherein at least a portion of the linking box that is near a location where the lens mount portion is provided and the main chassis are linked by a linking member.

2. The image-pickup apparatus according to claim 1, wherein the linking member is a component made of a conductive material.

3. The image-pickup apparatus according to claim 1, wherein the linking member is a metal component made by press-forming.

* * * * *